(12) United States Patent
Ogino et al.

(10) Patent No.: US 7,060,640 B2
(45) Date of Patent: Jun. 13, 2006

(54) OPTICAL GLASS

(75) Inventors: Michiko Ogino, Sagamihara (JP); Yoshio Mori, Yokohama (JP); Masahiro Onozawa, Sagamihara (JP)

(73) Assignee: Kabushiki Kaisha Ohara, Kanagawa-ken (JP)

( * ) Notice: Subject to any disclaimer, the term of this patent is extended or adjusted under 35 U.S.C. 154(b) by 283 days.

(21) Appl. No.: 10/616,661

(22) Filed: Jul. 10, 2003

(65) Prior Publication Data

US 2004/0018933 A1    Jan. 29, 2004

(30) Foreign Application Priority Data

Jul. 18, 2002  (JP) ............................. 2002-209242
Jul. 19, 2002  (JP) ............................. 2002-210408
Feb. 3, 2003   (JP) ............................. 2003-025421

(51) Int. Cl.
  *C03C 3/16*   (2006.01)
  *C03C 3/21*   (2006.01)
  *C03C 4/00*   (2006.01)

(52) U.S. Cl. ........................... 501/45; 501/46; 501/47; 501/48; 501/901; 501/903

(58) Field of Classification Search ........... 501/45–48, 501/901, 903
See application file for complete search history.

(56) References Cited

U.S. PATENT DOCUMENTS

| | | | | |
|---|---|---|---|---|
| 4,115,131 A | * | 9/1978 | Ishibashi et al. | 501/42 |
| 4,261,751 A | | 4/1981 | Nakamura et al. | |
| 4,505,569 A | * | 3/1985 | Seto et al. | 399/218 |
| 6,333,282 B1 | * | 12/2001 | Nakahata et al. | 501/45 |
| 6,786,064 B1 | * | 9/2004 | Hayashi et al. | 65/32.1 |
| 2002/0042337 A1 | | 4/2002 | Zou et al. | |
| 2002/0073735 A1 | * | 6/2002 | Hayashi et al. | 65/32.1 |
| 2004/0266602 A1 | * | 12/2004 | Fujiwara et al. | 501/46 |

FOREIGN PATENT DOCUMENTS

| | | | |
|---|---|---|---|
| JP | 10316448 A | * | 12/1998 |
| JP | 2003238197 A | * | 8/2003 |
| SU | 614040 A | * | 6/1978 |

OTHER PUBLICATIONS

Derwent-ACC-NO.: 1999-076322, Derwent Abstract of JP 10316448 A.*
Derwent-ACC-NO.: 2003-737419, Derwent Abstract of JP 2003238197 A.*
Derwent-ACC-NO.: 1979-38318B, Derwent Abstract of JP 2003238197 A.*
EPO Search Report.

* cited by examiner

*Primary Examiner*—Karl Group
*Assistant Examiner*—Elizabeth A. Bolden
(74) *Attorney, Agent, or Firm*—Hedman & Costigan, P.C.

(57) ABSTRACT

An optical glass comprises, in mass percent, 15–35% of $P_2O_5$, 40–60% of $Nb_2O_5$, 0.5% to less than 15% of $Na_2O$ and 3% to less than 25% of BaO, has a ratio in mass % of $(BaO+Nb_2O_5)/\{(TiO_2+WO_3)\times 3+Bi_2O_3+Nb_2O_5\}>1.0$; is free of Pb and As; and has a refractive index (nd) within a range from 1.78 to 1.90 and an Abbe number (vd) within a range from 18 to 27.

14 Claims, 1 Drawing Sheet

OPTICAL GLASS

BACKGROUND OF THE INVENTION

This invention relates to an optical glass and, more particularly, to a high-refractive, high-dispersion optical glass having optical constants of a refractive index (nd) within a range from 1.78 to 1.90 and an Abbe number (vd) within a range from 18–27, having excellent light transmittance and resistance to devitrification, and having excellent internal quality of glass.

If it is desired to produce a high-internal quality glass with an excellent yield in manufacture of glass, it is a general practice to employ a melting apparatus in which at least a portion which comes in contact with molten glass is made of platinum or platinum alloy in all or a part of the portion. For example, a crucible, tank, stirring blade and shaft made of platinum or platinum alloy are often used. In this case, however, if the melting temperature becomes high or a melting hour becomes long, the amount of platinum which melts into the molten glass increases and, as a result, platinum ion which has melted into the glass absorbs light. This causes a tendency toward decreasing transmittance, particularly transmittance in the short wavelength region, of the glass.

On the other hand, since internal quality of an optical glass is evaluated by the degree of striae, bubbles and inclusion (e.g., fine crystals or bubbles due to devitrification or other causes) existing in the glass, a glass having poor resistance to devitrification, poor removal of foam or poor melting property is subjected to a higher melting temperature or a longer melting time to make the melting condition optimum or is subjected to a process of increasing a defoaming agent for reducing striae, bubbles and inclusion of the glass and thereby improving the internal quality of the glass. Such treatment of the glass, however, decreases transmittance of the glass for the above described reason, i.e., melting of platinum into the glass and for various other reasons including mixing of inclusion.

In an optical design, a lens made of a high-refractive, high-dispersion optical glass is used in combination with a lens made of a low-refractive, low dispersion optical glass for correcting chromatic aberration of an optical system. Such combination is used in various optical instruments. The higher the refractive index and dispersion of a glass become, the larger amount of ingredients which impart the high-refractive, high-dispersion characteristics to the glass must generally be added. Since, however, these ingredients mostly absorb light in a short-wavelength region, transmittance in the short-wavelength region of the glass tends to deteriorate. Further, as the refractive index of the glass increases, reflectance on the surface of the glass increases and, therefore, as the refractive index increases, transmittance tends to decrease also due to this factor.

Known in the art of a high-refractive, high-dispersion optical glass having good transmittance in the short-wavelength region is a lead silicate glass containing a large amount of lead. For example, Japanese Patent Application Laid-open Publication No. 57-34042 discloses a high-refractive, high-dispersion glass of a $SiO_2$—$PbO$—$B_2O_3$ system containing a large amount of PbO which has excellent transmittance because the amount of molten platinum is small in this glass. The glass containing a large amount of PbO, however, is insufficient in chemical durability and, moreover, since it has a large specific gravity, a lens made of this glass is disadvantageous in producing an optical instrument of a light weight which is a rapidly prevailing tendency today. There is also a tendency toward ceasing use of a glass containing lead which is detrimental to the environment and, therefore, there is a demand for a high-refractive, high-dispersion optical glass which is free of lead and yet has excellent transmittance in the short-wavelength region which is equal to the $SiO_2$—$PbO$—$B_2O_3$ glass.

As a method for evaluating transmittance of an optical glass, comparison of degree of coloring specified by JOGIS02$^{-1975}$ is used. This method, however, cannot sufficiently evaluate color balance of transmitted light which is an important factor in the optical design.

For expressing the color balance of transmitted light, ISO Color Contribution Index (ISO/CCI (B/G/R)) is used according to which, by calculating this index on the basis of data of transmittance within a range from 350 nm to 680 nm measured by JOGIS02$^{-1975}$, the color balance of glass bulk itself is evaluated.

The ISO Color Contribution Index of a high-refractive, high dispersion glass generally exhibits the characteristic that, in a glass bulk in which an average transmittance value within a range from 530 nm to 680 nm measured by JOGIS 02$^{-1975}$ is substantially equal to that of a $SiO_2$—$PbO$—$B_2O_3$ glass and photographic responses of the green sensitive layer and the red sensitive layer of an average color film are substantially equal to those of the $SiO_2$—$PbO$—$B_2O_3$ glass, the higher the transmittance in the short-wavelength region of visible ray is, the smaller are values of G and R when the value B of the ISO Color Contribution Index is 0.

For example, commercially available PBH53W and PBH6W (made by Kabushiki Kaisha Ohara) which are typical $PbO$—$SiO_2$ glasses containing a large amount of lead exhibit the characteristic that they have excellent transmittance in the short-wavelength region and excellent internal transmittance and, therefore, they have small values of G and R of the ISO Color Contribution Index.

As a high-refractive, high-dispersion optical glass which is free of PbO, Japanese Patent Application Laid-open Publication No. 54-112915 discloses a $P_2O_5$—$R^I{}_2O$ and/or $ZnO$—$Nb_2O_5$ optical glass having very broad composition range and optical constants ranges. In this glass, however, glasses having a refractive index (nd) of 1.78 or over among specifically disclosed glasses are insufficient in resistance to devitrification and moreover insufficient in the melting property so that inclusion (fine crystals) tends to be produced in the glasses and, as a result, a glass of a good internal quality cannot be obtained. If a higher melting temperature or a longer melting time is employed for improving the internal quality of the glass, the amount of platinum which melts into the glass increases resulting in increase in values of G and R of the ISO Color Contribution Index of the glass bulk and, therefore, deterioration in the color balance in comparison with the $PbO$—$SiO_2$ glass.

Japanese Patent Application Laid-open Publication No. 52-132012 discloses a $P_2O_5$—$B_2O$—$Nb_2O_5$ and/or $R^{II}O$ optical glass having very broad composition range and optical constants ranges. In this glass, however, PbO-free glasses having a refractive index (nd) of 1.78 or over among specifically disclosed glasses are insufficient in resistance to devitrification and moreover insufficient in the melting property so that inclusion (fine crystals) tends to be produced in the glasses and, as a result, a glass of a good internal quality cannot be obtained. If it is attempted to improve the internal quality of this glass, the color balance of the glass deteriorates in comparison with the $PbO$—$SiO_2$ glass for the reason described above.

Japanese Patent Application Laid-open Publication No. 5-270853 discloses a $SiO_2$—$B_2O_3$—$P_2O_5$—$Nb_2O_5$—$Na_2O$ and/or $K_2O$ optical glass having very broad optical constant ranges. In this glass, however, glasses having a refractive index (nd) of 1.78 or over among specifically disclosed glasses are so poor in transmittance in the short-wavelength region that values of G and R of the ISO Color Contribution Index of the glass bulk are large. That is, the color balance of the glass in comparison with the $PbO$—$SiO_2$ glass is poor and the melting property of the glass is insufficient so that inclusion (i.e., fine crystals) and bubbles tend to be produced in the glass. If it is attempted to improve the internal quality of the glass, the color balance of the glass deteriorates even further for the reason stated above.

Japanese Patent Application Laid-open Publication No. 9-188540 discloses a $P_2O_5$—$Nb_2O_5$ optical glass. In this glass, however, glasses having a refractive index (nd) of 1.78 or over among specifically disclosed glasses have large values of G and R of the ISO Color Contribution Index of the glass bulk and, moreover, the melting property of the glass is insufficient so that inclusion (i.e., fine crystals) and bubbles tend to be produced in the glass. If it is attempted to improve the internal quality of the glass, the color balance of the glass deteriorates even further for the reason stated above. Japanese Patent Application Laid-open Publication No. 8-157231 discloses a $P_2O_5$—$B_2O_3$—$Nb_2O_5$—$Li_2O$—$Na_2O$—$SiO_2$ optical glass and a $P_2O_5$—$B_2O_3$—$Nb_2O_5$—$Li_2O$—$WO_3$ optical glass. These glasses, however, are insufficient in removal of foam, are difficult to obtain a homogeneous glass and, moreover, absorb a relatively large amount of light in the short-wavelength region so that values of G and R of the ISO Color Contribution Index of the glass bulk are large in comparison with the $PbO$—$SiO_2$ glass.

Japanese Patent Application Laid-open Publication No. 2001-58845 discloses a $P_2O_5$—$Na_2O$—$Nb_2O_5$—$Bi_2O_3$ optical glass. Specifically disclosed glasses in this publication, however, are insufficient in removal of foam, are difficult to obtain a homogeneous glass and, moreover, absorb a relatively large amount of light in the short-wavelength region so that values of G and R of the ISO Color Contribution Index of the glass bulk are large in comparison with the $PbO$—$SiO_2$ glass.

Japanese Patent Application Laid-open Publication No. 2002-173336 discloses a $P_2O_5$—$Bi_2O_3$—R' optical glass. Specifically disclosed glasses in this publication, however, are insufficient in removal of foam, are difficult to obtain a homogeneous glass resulting in generation of fine crystals and, moreover, absorb a relatively large amount of light in the short-wavelength region so that values of G and R of the ISO Color Contribution Index of the glass bulk are large in comparison with the $PbO$—$SiO_2$ glass.

Japanese Patent Application Laid-open Publication No. 2002-201041 discloses a $P_2O_5$—$WO_3$ optical glass for precision pressing. This glass, however, has large absorption of light in the short-wavelength region. Moreover, specifically disclosed glasses in this publication are insufficient in removal of foam and are difficult to obtain a homogeneous glass. If a higher melting temperature or a longer melting time is employed for improving the internal quality of the glass, the amount of platinum which melts into the glass increases resulting in further increase in values of G and R of the ISO Color Contribution Index of the glass bulk.

It is, therefore, an object of the present invention to eliminate the above described disadvantages of the prior art optical glass and provide a high-refractive, high-dispersion optical glass having optical constants of refractive index (nd) within a range from 1.78 to 1.90 and Abbe number (vd) within a range from 18 to 27 which, while maintaining color balance which is equivalent to that of the $SiO_2$—PbO glass, has excellent transmittance in the short-wavelength region, namely has small values of G and R of the ISO Color Contribution Index and excellent internal quality and resistance to devitrification.

SUMMARY OF THE INVENTION

Laborious studies and experiments made by the inventors of the present invention for achieving the above-described object of the present invention have resulted in the finding, which has led to the present invention, that a high-refractive, high-dispersion optical glass having excellent transmittance including the color balance, i.e., having small values of G and R of the ISO Color Contribution Index, and moreover having an excellent internal quality can be obtained in glasses of specific, novel compositions in a $P_2O_5$—$BaO$—$Na_2O$—$Nb_2O_5$ glass and that, by adding $Gd_2O_3$ to these compositions, a high-refractive, high-dispersion optical glass having even improved transmittance in the short-wavelength region, having an excellent internal quality, particularly resistance to devitrification, and having a low glass transition point can be easily obtained.

For achieving the object of the present invention, there is provided an optical glass comprising, in mass percent:

| | |
|---|---|
| $P_2O_5$ | 15–35% |
| $Nb_2O_5$ | 40–60% |
| $Na_2O$ | 0.5% to less than 15% and |
| BaO | 3% to less than 25%; | having a ratio in mass % of $(BaO+Nb_2O_5)/\{(TiO_2+WO_3)\times 3+Bi_2O_3+Nb_2O_5\}>1.0$; being free of Pb and As; and having a refractive index (nd) within a range from 1.78 to 1.90 and an Abbe number (vd) within a range from 18 to 27.

In one aspect of the invention, there is provided an optical glass further comprising, in mass %:

| | |
|---|---|
| $Gd_2O_3$ | 0–5% and/or |
| $K_2O$ | 0–10% and/or |
| $Li_2O$ | 0–10% and/or |
| $Bi_2O_3$ | 0–5% and/or |
| MgO | 0–10% and/or |
| CaO | 0–10% and/or |
| SrO | 0–10% and/or |
| ZnO | 0–3% and/or |
| $SiO_2$ | 0–5% and/or |
| $B_2O_3$ | 0–5% and/or |
| $Al_2O_3$ | 0–4% and/or |
| $Ta_2O_5$ | 0–5% and/or |
| $ZrO_2$ | 0–3% and/or |
| $TiO_2$ | 0–5% and/or |
| $WO_3$ | 0–8% and/or |
| $Sb_2O_3$ | 0–0.02%. |

In another aspect of the invention, in X-Y rectangular co-ordinates with X-axis representing ISO Color Contribution Index G calculated by using spectral transmittance of a glass material measured by the Japan Optical Glass Industry Standard JOGIS02$^{-1975}$ (the method for measuring degree of coloring of an optical glass) and Y-axis representing refractive index (nd), the optical glass is within an area having a smaller value of ISO Color Contribution Index G and a higher refractive index (nd) than a straight line (SL3-G): Y=0.0277X+1.725 and which, in X-Y rectangular co-ordinates with X-axis representing ISO Color Contribution Index R calculated by using spectral transmittance of a glass bulk measured by the Japan Optical Glass Industry Standard JOGIS02$^{-1975}$ and Y-axis representing refractive index (nd), is within an area having a smaller value of ISO Color Contribution Index R and a higher refractive index (nd) than a straight line (SL3-R): Y=0.0273X+1.7102.

In another aspect of the invention, in the optical glass, the sum of sectional areas of bubbles contained in glass of 100 ml shown in Table 1 of the Japan Optical Glass Industry Standard JOGIS12$^{-1994}$ (Measuring Method for Bubble in Optical Glass) is Class 1–Class 4 and the sum of sectional areas of inclusion contained in glass of 100 ml shown in Table 1 of the Japan Optical Glass Industry Standard JOGIS13$^{-1994}$ (Measuring Method for Inclusion in Optical Glass) is Class 1–Class 4.

In another aspect of the invention, in X-Y rectangular co-ordinates with X-axis representing ISO Color Contribution Index G calculated by using spectral transmittance of a glass material measured by the Japan Optical Glass Industry Standard JOGIS02$^{-1975}$ (Measuring Method for measuring Degree of Coloring of Optical Glass) and Y-axis representing refractive index (nd), the optical glass is within an area having a smaller value of ISO Color Contribution Index G and a higher refractive index (nd) than a straight line (SL5-G): Y=0.0329X+1.7174 and which, in X-Y rectangular co-ordinates with X-axis representing ISO Color Contribution Index R calculated by using spectral transmittance of a glass bulk measured by the Japan Optical Glass Industry Standard JOGIS02$^{-1975}$ and Y-axis representing refractive index (nd), is within an area having a smaller value of ISO Color Contribution Index R and a higher refractive index (nd) than a straight line (SL5-R): Y=0.0288X+1.713.

In another aspect of the invention, the optical glass comprises, in mass percent:

| | |
|---|---|
| $P_2O_5$ | 15–35% |
| $Nb_2O_5$ | 40–60% |
| $Na_2O$ | 0.5% to less than 15% and |
| BaO | 3% to less than 25%; | and further comprises, in mass %:

| | |
|---|---|
| $Gd_2O_3$ | 0–4% and/or |
| $K_2O$ | 0–6% and/or |
| $Li_2O$ | 0% to less than 6% and/or |
| $Bi_2O_3$ | 0% to less than 5% and/or |
| MgO | 0% to less than 10% and/or |
| CaO | 0% to less than 10% and/or |
| SrO | 0% to less than 10% and/or |
| ZnO | 0–3% and/or |
| $SiO_2$ | 0–5% and/or |
| $B_2O_3$ | 0–5% and/or |
| $Al_2O_3$ | 0–4% and/or |
| $Ta_2O_5$ | 0–5% and/or |
| $ZrO_2$ | 0–3% and/or |
| $Sb_2O_3$ | 0–0.02% and/or |
| $TiO_2$ | 0–5% and/or |
| $WO_3$ | 0–8% and/or |
| a fluoride or fluorides of a metal element or elements contained in the above metal oxides, a total amount of F contained in the fluoride or fluorides has a ratio in mass % of $(BaO + Nb_2O_5)/\{(TiO_2 + WO_3) \times 3 + Bi_2O_3 + Nb_2O_5\} > 1.0$. | 0–5%; and |

In another aspect of the invention, the optical glass comprises, in mass percent:

| | |
|---|---|
| $P_2O_5$ | 15–35% |
| $Nb_2O_5$ | 40–60% |
| $Na_2O$ | 0.5% to less than 15% and |
| BaO | 3% to less than 25%; | and further comprises, in mass %:

| | |
|---|---|
| $Gd_2O_3$ | 0.1–4% and/or |
| $K_2O$ | 0–6% and/or |
| $Li_2O$ | 0% to less than 6% and/or |
| $Bi_2O_3$ | 0% to less than 4.5% and/or |
| MgO | 0% to less than 10% and/or |
| CaO | 0% to less than 10% and/or |
| SrO | 0% to less than 10% and/or |
| ZnO | 0–3% and/or |
| $SiO_2$ | 0% to less than 5% and/or |
| $B_2O_3$ | 0% to less than 5% and/or |
| $Al_2O_3$ | 0–4% and/or |
| $Ta_2O_5$ | 0–5% and/or |
| $ZrO_2$ | 0–3% and/or |
| $Sb_2O_3$ | 0–0.01% and/or |
| $TiO_2$ | 0–5% and/or |
| $WO_3$ | 0–8% and/or |
| a fluoride or fluorides of a metal element or elements contained in the above metal oxides, a total amount of F contained in the fluoride or fluorides has a ratio in mass % of $(BaO + Nb_2O_5)/\{(TiO_2 + WO_3) \times 3 + Bi_2O_3 + Nb_2O_5\} > 1.0$. | 0–5%; and |

In another aspect of the invention, in X-Y rectangular co-ordinates with X-axis representing ISO Color Contribution Index G calculated by using spectral transmittance of a glass material measured by the Japan Optical Glass Industry Standard JOGIS02$^{-1975}$ (Measuring Method for Degree of Coloring of Optical Glass) and Y-axis representing refractive index (nd), the optical glass is within an area having a smaller value of ISO Color Contribution Index G and a higher refractive index (nd) than a straight line (SL8-G): Y=0.0329X+1.7245 and which, in X-Y rectangular co-ordinates with X-axis representing ISO Color Contribution Index R calculated by using spectral transmittance of a glass bulk measured by the Japan Optical Glass Industry Standard JOGIS02$^{-1975}$ and Y-axis representing refractive index (nd), is within an area having a smaller value of ISO Color Contribution Index R and a higher refractive index (nd) than a straight line (SL8-R): Y=0.0288X+1.7208.

In another aspect of the invention, the optical glass comprises, in mass percent:

| | |
|---|---|
| $P_2O_5$ | 15–30% |
| $Nb_2O_5$ | 42–60% |
| $Na_2O$ | 0.5% to less than 10% and |
| BaO | 5% to less than 25%; | and further comprises, in mass %:

| | |
|---|---|
| $Gd_2O_3$ | 0.1–4% and/or |
| $K_2O$ | 0–6% and/or |
| $Li_2O$ | 0–2% and/or |

-continued

| | |
|---|---|
| $Bi_2O_3$ | 0% to less than 4.5% and/or |
| MgO | 0% to less than 10% and/or |
| CaO | 0% to less than 10% and/or |
| SrO | 0% to less than 10% and/or |
| ZnO | 0–3% and/or |
| $SiO_2$ | 0.1% to less than 4% and/or |
| $B_2O_3$ | 0.2% to less than 5% and/or |
| $Al_2O_3$ | 0–4% and/or |
| $Ta_2O_5$ | 0–5% and/or |
| $ZrO_2$ | 0–3% and/or |
| $Sb_2O_3$ | 0–0.01% and/or |
| $TiO_2$ | 0–3% and/or |
| $WO_3$ | 0–5% and/or |
| a fluoride or fluorides of a metal element or elements contained in the above metal oxides, a total amount of F contained in the fluoride or fluorides has a ratio in mass % of $(BaO + Nb_2O_5)/\{(TiO_2 + WO_3) \times 3 + Bi_2O_3 + Nb_2O_5\} > 1.1$. | 0–5%; and |

In another aspect of the invention, there is provided an optical glass comprising, in mass percent:

| | |
|---|---|
| $P_2O_5$ | 15–35% |
| $Nb_2O_5$ | 40–60% |
| $Gd_2O_3$ | 0.1–4% |
| $Na_2O$ | 0.5% to less than 10% |
| $K_2O$ | 0–6% |
| where the total amount of $Na_2O$ and $K_2O$ is | 0.5% to less than 10% |
| $Bi_2O_3$ | 0% to less than 5% |
| MgO | 0% to less than 10% |
| CaO | 0% to less than 10% |
| SrO | 0 to less than 10% |
| BaO | 0.5% to less than 25% |
| ZnO | 0–3% |
| $SiO_2$ | 0% to less than 5% |
| $B_2O_3$ | 0.2% to less than 5% |
| $Al_2O_3$ | 0–3% |
| $Ta_2O_5$ | 0–5% |
| $ZrO_2$ | 0–3% |
| $Sb_2O_3$ | 0–0.03% |
| and a fluoride or fluorides of a metal element or elements contained in the above metal oxides, a total amount of F contained in the fluoride or fluorides being free of Pb, $WO_3$ and $TiO_2$ and having a refractive index (nd) within a range from 1.78 to 1.90 and an Abbe number (vd) within a range from 18 to 27. | 0–5%; |

In another aspect of the invention, there is provided an optical glass comprising, in mass percent:

| | |
|---|---|
| $P_2O_5$ | 15–30% |
| $Nb_2O_5$ | 42–60% |
| $Gd_2O_3$ | 0.1–4% |
| $Na_2O$ | 0.5–9.6% |
| $K_2O$ | 0–6% |
| where the total amount of $Na_2O$ and $K_2O$ is | 0.5% to 9.6% |
| $Bi_2O_3$ | 0–4.5% |
| MgO | 0% to less than 10% |
| CaO | 0% to less than 10% |
| SrO | 0% to less than 10% |
| BaO | 0.5% to less than 25% |
| ZnO | 0–3% |
| $SiO_2$ | 0.1% to less than 4% |
| $B_2O_3$ | 0.2% to less than 5% |
| $Al_2O_3$ | 0–3% |
| $Ta_2O_5$ | 0–5% |
| $ZrO_2$ | 0–3% |
| $Sb_2O_3$ | 0–0.03% |
| and a fluoride or fluorides of a metal element or elements contained in the above metal oxides, a total amount of F contained in the fluoride or fluorides being free of Pb, $WO_3$ and $TiO_2$ and having a refractive index (nd) within a range from 1.78 to 1.90 and an Abbe number (vd) within a range from 18 to 27. | 0–5%; |

In another aspect of the invention, in the optical glass, the sum of sectional areas of bubbles contained in glass of 100 ml shown in Table 1 of the Japan Optical Glass Industry Standard JOGIS12$^{-1994}$ (Measuring Method for Bubble in Optical Glass) is Class 1–Class 3, the sum of sectional areas of inclusion contained in glass of 100 ml shown in Table 1 of Japan Optical Glass Industry Standard JOGIS13$^{-1994}$ (Measuring Method for Inclusion in an Optical Glass) is Class 1–Class 3, and the degree of striae shown in Table 2 of the Japan Optical Glass Industry Standard JOGIS11$^{-1975}$ (Measuring Method for Striae in Optical Glass) is Class 1–Class 3.

In still another aspect of the invention, in the optical glass, the degree of striae shown in Table 2 of the Japan Optical Glass Industry Standard JOGIS11$^{-1975}$ Measuring Method for Striae in Optical Glass) is Class 1 or Class 2, the sum of sectional areas of bubbles contained in glass of 100 ml shown in Table 1 of the Japan Optical Glass Industry Standard JOGIS12$^{-1994}$ (Measuring Method for Bubble in Optical Glass) is Class 1 or Class 2, and the sum of sectional areas of inclusion contained in glass of 100 ml shown in Table 1 of Japan Optical Glass Industry Standard JOGIS13$^{-1994}$ (Measuring Method for Inclusions in Optical Glass) is Class 1 or Class 2.

BRIEF DESCRIPTION OF THE DRAWINGS

In the accompanying drawings.

DETAILED DESCRIPTION OF THE INVENTION

Figure 1:
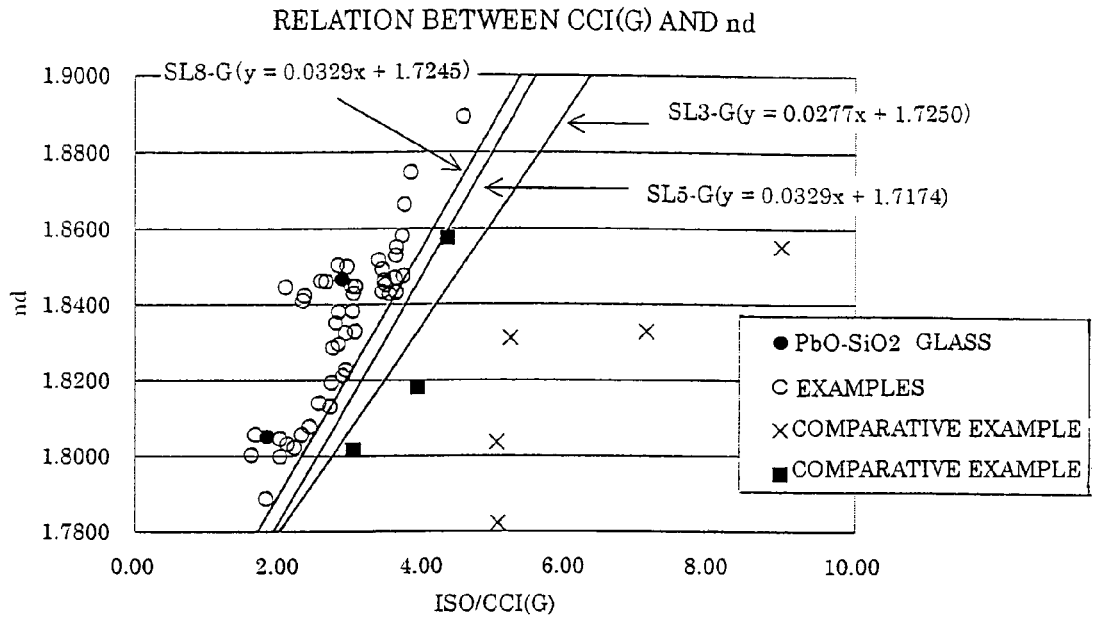
FIG. 1 is a graph showing X-Y coordinates with X-axis representing G value (calculated down to the second decimal place) of ISO Color Contribution Index (ISO/CCI) specified in JIS7097 (expression of color contribution by ISO/CCI for taking a photograph) calculated on the basis of transmittance of a glass bulk within a range from 350 nm to 680 nm specified in JOGIS02$^{-1975}$, and Y-axis representing refractive index (nd)

Reasons for limiting the composition of respective ingredients of the optical glass of the present invention to specific ranges will now be described. Amounts of respective ingredients described below will be expressed in mass %.

$P_2O_5$ is an ingredient which imparts a high dispersion characteristic and also high transmittance to the glass. As compared to a silicate glass and a borate glass, the $P_2O_5$ ingredient can impart excellent melting property and resistance to devitrification, particularly resistance to devitrification during pressing, and also excellent transmittance to the glass. For achieving these effects, the amount of this ingredient should preferably be 15% or over. If the amount of this ingredient exceeds 35%, desired high refractive index cannot be achieved and resistance to devitrification is rather deteriorated than improved. For obtaining a high-refractive, high-dispersion glass having particularly high resistance to devitrification, the lower limit of this ingredient more preferably is 16% and/or the upper limit thereof is 33% and, most preferably the lower limit of this ingredient is 17% and/or the upper limit thereof is 30%.

$Nb_2O_5$ is a very important ingredient which glassifies glass materials over a broad range and also is effective for making the glass high-refractive and high-dispersion without substantially increasing the degree of coloring of the glass and further improving chemical durability of the glass. For achieving these effects sufficiently, the amount of this ingredient should preferably be 40% or over. If, however, the amount of this ingredient exceeds 60%, resistance to devitrification tends to deteriorate and transmittance tends to be reduced and, for this reason, the amount of this ingredient should preferably be not more than 60%. More preferably, the lower limit of this ingredient is 41% and/or the upper limit thereof is 58% and, most preferably, the lower limit of this ingredient is 42% and/or the upper limit thereof is 56.5%.

$WO_3$ is an ingredient which imparts a high-refractive, high-dispersion characteristic to the glass while maintaining a low melting point characteristic and can be added as an optional ingredient. If the amount of this ingredient exceeds 8%, transmittance in the short-wavelength region tends to deteriorate and thereby increase G and R values of ISO/CCI. Therefore, the amount of this ingredient should preferably be not more than 8% and, more preferably not more than 5%. If it is desired to produce a glass having a particularly excellent internal quality and particularly good transmittance in the short-wavelength region, it is preferable not to add this ingredient.

$TiO_2$ is an ingredient which increases refractive index of the glass but is also an ingredient which deteriorates transmittance of the glass and, moreover, deteriorates resistance to devitrification during melting and pressing of the glass. For these reasons, the amount of this ingredient should preferably be not more than 5% and, more preferably, be not more than 3%. If it is desired to produce a glass having a particularly excellent internal quality and particularly good transmittance in the short-wavelength region, it is preferable not to add this ingredient.

BaO is effective for stabilizing glass during melting, preventing devitrification and cracking of glass and, moreover, improving transmittance of the glass. On the other hand, if this ingredient is added in an excessive amount, it becomes difficult to obtain a high-refractive, high-dispersion glass which is the object of the invention. Preferably, the lower limit of this ingredient is 0.5% and/or the upper limit thereof is less than 25%, more preferably, the lower limit of this ingredient is 3% and/or the upper limit thereof is 24.7%, and most preferably, the lower limit of this ingredient is 5% and/or the upper limit thereof is 24.5%.

For achieving particularly good G and R values of ISO/CCI, the ratio of $(BaO+Nb_2O_5)/\{(TiO_2+WO_3)\times 3+Bi_2O_3+Nb_2O_5\}$ calculated in mass % of BaO, $Nb_2O_5$, $TiO_2$, $WO_3$ and $Bi_2O_3$ should preferably be a greater value than 1.0.

For obtaining a high-refractive, high-dispersion glass which is free of PbO, it is desirable to add ingredients such as $Nb_2O_5$, $TiO_2$, $WO_3$ and $Bi_2O_3$ which impart a high-refractive, high-dispersion characteristic to the glass. However, in comparison with $Nb_2O_5$, $TiO_2$, $WO_3$ and $Bi_2O_3$ absorb more light in the short-wavelength region thereby increasing G and R values of ISO/CCI and, moreover, tend to produce phase separation and bubbles during melting of the glass resulting in difficulty in producing a glass of a good internal quality. For this reason, it is not desirable to add relatively large amounts of $TiO_2$, $WO_3$ and $Bi_2O_3$ and thereby reduce the value of the above described ratio to 1.0 or below. Co-existence of BaO with $Nb_2O_5$ which increases refractive index and dispersion of the glass is effective, as described previously, for stabilizing the glass during melting, preventing devitrification and improving transmittance in the short-wavelength region while maintaining the high-refractive, high-dispersion characteristic of the glass. It is very important for easily producing the glass of the present invention to adjust the amounts of these ingredients so that the above described ratio of these ingredients will be achieved.

The value of this ratio should preferably be greater than 1.1 and most preferably be greater than 1.15.

In the $P_2O_5$—$Nb_2O_5$—BaO—$R_2O$ glass, $Gd_2O_3$ is effective for improving transmittance of the glass while maintaining a high-refractive characteristic, and improving stability of the glass during melting and resistance to devitrification and also improving homogeneity of the glass. Besides, this ingredient has resistance to phase separation. For these reasons, this ingredient is useful for easily obtaining a glass of a good internal quality and may be added as an optional ingredient. If, however, the amount of this ingredient exceeds 5%, resistance to devitrification deteriorates rather than improves. Preferably, the lower limit of this ingredient is 0.1% and/or the upper limit thereof is 4.8%, more preferably the lower limit of this ingredient is 0.3% and/or the upper limit thereof is 4.5% and, most preferably, the lower limit of this ingredient is 0.5% and/or the upper limit thereof is 4%.

$Na_2O$ is effective for lowering the melting temperature, preventing coloring of the glass and also lowering the glass transition temperature and yield point temperature. For achieving these effects, this ingredient should be added preferably in an amount of 0.5% or over. If, however, the amount of this ingredient is 15% or over, it becomes difficult to produce a high-refractive glass which is the object of the invention. For producing a particularly high-refractive glass having sufficient weather resistance, the upper limit of this ingredient should more preferably be less than 10%. In a case where it is desired to produce a glass having a small average coefficient of thermal expansion, the amount of this ingredient should most preferably be 9.6% or below. As to the lower limit of this ingredient, it should more preferably be 1% and, most preferably, be 3%.

$K_2O$ is effective for lowering the glass transition temperature and yield point temperature of the glass and may be added as an optional ingredient. If the amount of this ingredient exceeds 10%, devitrification tends to occur during melting of the glass resulting in deterioration in the internal quality of the glass and, moreover, deterioration in processability and tendency to cracking develop. A preferable upper limit of this ingredient, therefore, is 6%. If the glass transition temperature and yield point of the glass can be lowered to desired temperatures by employing other ingredients, it is preferable not to use $K_2O$.

In a case where it is desired to produce a glass having very excellent weather resistance or a glass having a small coefficient of thermal expansion, the total amount of $Na_2O$ and $K_2O$ should preferably be less than 10%, more preferably be 9.8% or less and, most preferably, be 9.6% or less.

$Li_2O$ is effective for lowering the glass transition temperature and yield point temperature of the glass and may be added as an optional ingredient. If the amount of this ingredient exceeds 10%, chemical durability and processability of the glass deteriorate. The amount of this ingredient should preferably be less than 6%. For producing a glass having good chemical durability and processability and having a small coefficient of thermal expansion, the most preferable amount of this ingredient is 2% or below.

$SiO_2$ is effective for improving chemical durability of the glass and may be added as an optional ingredient. If the amount of this ingredient exceeds 5%, melting property of the glass tends to deteriorate. For producing a glass having a particularly excellent melting property, the upper limit of this ingredient should be 5%. For producing a glass having a particularly excellent chemical durability, a preferable lower limit of this ingredient is 0.1% and/or a preferable upper limit thereof is less than 5%, a more preferable lower limit of this ingredient is 0.2% and/or a more preferable upper limit thereof is less than 4%, and the most preferable lower limit of this ingredient is 0.3% and the most preferable upper limit thereof is 2%.

$B_2O_3$ is effective for improving weather resistance of the glass and may be added as an optional ingredient. In the $P_2O_5$—$Nb_2O_5$ glass, the $SiO_2$ ingredient tends to produce a portion which remains unmelted but, by coexistence with $B_2O_3$, a glass with improved melting property and having excellent chemical durability can be easily produced. If, however, the amount of this ingredient exceeds 5%, it becomes difficult to produce a glass having a high-refractive, high-dispersion characteristic which is the object of the invention. For achieving these effects without being accompanied by the disadvantage, a preferable lower limit of this ingredient is 0.2% and/or a preferable upper limit thereof is less than 5% and the most preferable lower limit of this ingredient is 0.3% and the most preferable upper limit thereof is 3%.

MgO, CaO and SrO are effective for stabilizing the glass during melting and preventing devitrification and may be added as optional ingredients. If the amount of each of these ingredients exceeds 10%, it becomes difficult to produce a homogeneous glass. A more preferable amount of each of these ingredients is less than 10%. Most preferably, the upper limit of CaO is 3% and/or MgO is not added and/or SrO is not added.

$Bi_2O_3$ is effective for lowering melting point of the glass and making the glass high-refractive, high-dispersion and may be added as an optional ingredient. If, however, the amount of this ingredient exceeds 5%, transmittance in the short-wavelength region tends to deteriorate resulting in increase of G and R values of ISO/CCI and, therefore, deterioration in the color balance and, further, tendency to devitrification during melting of the glass increases. For this reason, the amount of this ingredient should be 5% or less, preferably be less than 5%, more preferably be 4.5% or below and, most preferably be less than 4.5%.

$Al_2O_3$ is effective for improving chemical durability and transmittance of the glass and may be added as an optional ingredient. If, however, the amount of this ingredient exceeds 4%, the tendency to devitrification increases. A more preferable upper limit of this ingredient is 3% and the most preferable upper limit thereof is 2%.

ZnO and $ZrO_2$ are effective for adjusting optical constants of the glass and may be added as optional ingredients. If, however, each of these ingredients exceeds 3%, resistance to devitrification deteriorates. More preferably, the upper limit of ZnO is less than 3% and/or the upper limit of $ZrO_2$ is 2.5% and, most preferably, the upper limit of ZnO is 2.9% and/or the upper limit of $ZrO_2$ is 2%.

$Ta_2O_5$ is effective for making the glass high-refractive and may be added as an optional ingredient. If, however, the amount of this ingredient exceeds 5%, striaes tend to occur resulting in difficulty in obtaining a homogeneous glass. Since $Ta_2O_5$ is a very expensive ingredient, it should preferably be added only in case it is necessary for achieving desired properties. A preferable upper limit of this ingredient is 3% and, most preferably, it should not be added.

$Sb_2O_3$ is effective for enhancing removal of foam of the glass during melting by adding a small amount of this ingredient and may be added as an optional ingredient. If, however, the amount of this ingredient increases beyond a critical value even by a small amount, transmittance in the short-wavelength region tends to deteriorate resulting in increase in G and R values of ISO/CCI and, therefore, deterioration in the color balance. Therefore the amount of addition of this ingredient should be up to 0.03%. A preferable upper limit of this ingredient is 0.02%, a more preferable upper limit thereof is 0.01% and the most preferable upper limit thereof is 0.001% or below.

To the optical glass of the invention may be added a fluoride or fluorides of a metal element or elements contained in the above metal oxides, a total amount of F contained in the fluoride or fluorides being up to 5%. F is effective for improving removal of foam and also improving transmittance in the short-wavelength region of visible ray. If, however, the amount of F exceeds 5%, striaes tend to occur. A preferable upper limit of this ingredient is 3% and a more preferable upper limit thereof is 1%. Most preferably, this ingredient should not be added.

Pt has a function of lowering transmittance in the short-wavelength region and, therefore, the amount of Pt in the glass should be restrained to the maximum extent possible. A preferable amount of Pt in the glass is 1.5 ppm or below, a more preferable amount thereof is 1 ppm or below and the most preferable amount thereof is 0.9 ppm or below.

If necessary, ingredients other than those described above may be added within a scope not impairing characteristics of the glass of the present invention. If, however, the glass contains even a small amount of transition metals other than Ti such as V, Cr, Mn, Fe, Co, Ni, Cu, Ag and Mo singly or in combination, the glass is colored and absorbs a specific wavelength of the visible ray region and, therefore, it is preferable not to contain such transition metal in the optical glass using wavelengths of the visible ray region.

If the glass contains rare earth ingredients other than Lu and Gd singly or in combination, absorption of a specific wavelength in the visible ray region takes place due to coloring of the glass or the tendency to devitrification increases. Therefore, it is preferable not to contain these rear earth ingredients. Lu can be optionally used for adjusting optical constants of the glass. If, however, the amount of $Lu_2O_3$ exceeds 3%, resistance to devitrification tends to deteriorate and, therefore, the amount of this ingredient should preferably be 3% or below and, more preferably, be 2.5% or below. It is most preferable for the glass not to contain this ingredient at all.

Th may be added for making the glass high-refractive and improving stability of the glass and Cd and Tl may be added for lowering the glass transition temperature. In view of the recent tendency to refraining from using Pb, Th, Cd, Tl and Os as harmful chemical substance, steps must be taken to protect the environment in carrying out processes of manufacture and processing of the glass and disposal of the glass after manufacture and, therefore, it is preferable not to use these ingredients substantially when an influence to the environment must be considered.

PbO has such a large specific gravity that a lens made of glass containing PbO is disadvantageous in realizing an optical instrument of a light weight design. Further, steps must be taken for protecting the environment in carrying out processes of manufacture and processing of the glass and disposal of the glass as described above and such steps require further cost. For these reasons, the glass of the present invention should not contain PbO.

$As_2O_3$ is an ingredient used for enhancing removal of foam during melting of the glass. Since it is necessary to take steps for protecting the environment in processes of manufacture and processing of the glass and disposal of the glass, it is not preferable to add $As_2O_3$ in the glass of the present invention.

As regards evaluation of bubbles, bubbles increase scattering of light as the class of evaluation of bubbles increases. It is therefore not preferable to use glass of a high class. Preferably, glass of Class 1 to Class 4 should be used and, more preferably, glass of Class 1 to Class 3 should be used and, most preferably, glass of Class 1 or Class 2 should be used.

As regards evaluation of inclusion, inclusion increases scattering of light as the class of evaluation of inclusion increases. It is therefore not preferable to use glass of a high class. Preferably, glass of Class 1 to Class 4 should be used and, more preferably, glass of Class 1 to Class 3 should be used and, most preferably, glass of Class 1 or Class 2 should be used.

As regards evaluation of striae, difficulty increases in producing a homogeneous glass as the class of evaluation of striae increases. It is therefore not preferable to use glass of a high class in producing an optical glass in which homogeneity of the glass is important. A glass of Class 1 to Class 4 can be used as a lens of an optical instrument. For this reason, preferably glass of Class 1 to Class 4 should be used, more preferably glass of Class 1 to Class 3 should be used and, most preferably, glass of Class 1 or Class 2 should be used.

EXAMPLES

Tables 1 to 10 show compositions of Examples No. 1 to No. 48 of the optical glass of the present invention together with their refractive index (nd), Abbe number (vd), values G and R of ISO Color Contribution Index (ISO/CCI) calculated down to the second decimal place when value of B is zero and evaluation of bubbles (Class), inclusion (Class) and striae (Class).

It should be noted that the present invention is in no way limited by these examples.

For manufacturing the glasses of Examples No. 1 to No. 48, ordinary glass materials for an optical glass such as oxides, carbonates, nitrates and fluorides were weighed and mixed in ratios for realizing compositions of the examples of Tables 1 to 10 and put in a quartz crucible for preliminary melting. After the preliminary melting of the raw materials, the melt was transferred to a platinum crucible and melted further at 850° C. to 1300° C. for one to four hours depending upon the melting property of the glass determined by the composition and stirred and refined. Then, the melt was cast into a mold and annealed to produce the glass.

Samples for evaluating striae of glasses of Examples No. 1 to No. 46 were prepared by melting materials preliminarily in a crucible not containing platinum (i.e., quartz crucible) and further melting the melt in accordance with the method introduced by Dr. Hans Bach, editor, Low Thermal Expansion Glass Ceramics (Springer-Verlag Berlin Heidelberg Printed in Germany 1995), 133, FIG. 4.13 in a device with a stirring unit made of platinum or platinum alloy and with a part which comes in contact with the melt being entirely or partially made of platinum or platinum alloy at a temperature of 850° C. to 1300° C. and then annealing the melt.

Samples for evaluating striae of glasses of Examples No. 47 and No. 48 were prepared by melting materials preliminarily in a crucible not containing platinum (i.e., quartz crucible) and further melting the melt in accordance with the method disclosed in Japanese Patent Publication No. 43-12885 and the method introduced by Dr. Hans Bach, editor, Low Thermal Expansion Glass Ceramics (Springer-Verlag Berlin Heidelberg Printed in Germany 1995), 132 in a device with a part which comes in contact with the melt being entirely or partially made of platinum or platinum alloy at a temperature of 850° C. to 1300° C. and then annealing the melt.

Results of evaluation of striae as to the samples for Example Nos. 47 and 48 were not substantially different from results of evaluation of striae as to the samples for Example No. 1 to No. 46.

Tables 11 and 12 show Comparative Examples A to I which are glasses of Example No. 3 of Japanese Patent Application Laid-open Publication No. 5-270853, Example No. 4 of Japanese Patent Application Laid-open Publication No. 5-270853, Example No. 7 of Japanese Patent Application Laid-open Publication No. 9-188540, Example No. 12 of Japanese Patent Application Laid-open Publication No. 2001-58845, Example No. 27 of Japanese Patent Application Laid-open Publication No. 52-132012, Example No. 38 of Japanese Patent Application Laid-open Publication No. 2002-173336, Example No. 33 of Japanese Patent Application Laid-open Publication No. 2002-173336, Example No. 4 of Japanese Patent Application Laid-open Publication No. 2002-201041 and Example No. 3 of Japanese Patent Application Laid-open Publication No. 54-112915. Physical properties of these glasses were measured in the same manner as in the Examples of the present invention.

For manufacturing the glasses of comparative examples, ordinary glass materials for an optical glass were weighed and mixed in ratios for realizing compositions of the comparative examples of Tables 11 and 12 and put in a quartz crucible for preliminary melting. After the preliminary melting of the raw materials, the melt was transferred to a platinum crucible and melted further at 850° C. to 1300° C. for one to four hours depending upon the melting property of the glass determined by the composition and stirred and refined. Then, the melt was cast into a mold and annealed to produce the glass. The composition of Comparative Example B, however, did not glassify.

Tables 11 and 12 show refractive index (nd), Abbe number (vd), values G and R of ISO Color Contribution Index (ISO/CCI) calculated down to the second decimal place when value of B is zero and evaluation of bubbles (Class) and inclusion (Class).

Evaluation of bubbles was made in accordance with the Japan Optical Glass Industry Standard JOGIS12[-1994] "Method for measuring bubbles in an optical glass" and results of classifying on the basis of the sum ($mm^2$) of sectional areas of bubbles in glass of 100 ml in accordance with Table 1 of this Standard are shown in the Tables. Class 1 represents that the sum of sectional areas of bubbles is less than 0.03 $mm^2$, Class 2 represents that the sum is 0.03—less than 0.1 mm², Class 3 represents that the sum is 0.1—less than 0.25 mm², Class 4 represents that the sum is 0.25—less than 0.5 mm² and Class 5 represents that the sum is 0.5 mm² or over.

Evaluation of inclusion was made in accordance with the Japan Optical Glass Industry Standard JOGIS13-1994 "Measuring Method for Inclusion in Optical Glass" and results of classifying on the basis of the sum (mm²) of sectional areas of inclusion in glass of 100 ml in accordance with Table 1 of this Standard are shown in the Tables. Class 1 represents that the sum of sectional areas of inclusion is less than 0.03 mm², Class 2 represents that the sum is 0.03—less than 0.1 mm², Class 3 represents that the sum is 0.1—less than 0.25 mm², Class 4 represents that the sum is 0.25—less than 0.5 mm² and Class 5 represents that the sum is 0.5 mm² or over.

Evaluation of striae was made in accordance with the Japan Optical Glass Industry Standard JOGIS11-1975 "Measuring Method for Striae in Optical Glass" and results of classifying the degree of striae in accordance with Table 2 of this Standard are shown in the Tables. As a specimen for measurement of striae, a glass piece of 50×50×20 mm with its two parallel surfaces polished was employed. Class 1 represents that no striae is observed, Class 2 represents that thin and scattered striae is observed within a visible limit, Class 3 represents that a slight striae parallel to the vertical direction to the polished surfaces is observed and Class 4 represents that a larger number of striaes parallel to the vertical direction to the polished surfaces than Class 3 are observed, or a thick parallel striae is observed.

ISO Color Contribution Index (ISO/CCI) was measured in the following manner. A specimen having a thickness of 10±0.1 mm with two polished parallel surfaces was made from a glass bulk produced. The specimen was annealed and, immediately after annealing, transmittance (spectral transmittance) was measured by the method according to JOGIS02-1975. Then, ISO Color Contribution Index (ISO/CCI) calculated in accordance with JISB7097 (Expression of color characteristic for taking a photograph by ISO Color Contribution Index (ISO/CCI)) by substituting transmittance of the glass bulk within 350–680 nm by transmittance of a lens was used as ISO Color Contribution Index (ISO/CCI) of the glass bulk. Values of G and R were calculated down to the second decimal place when B (blue) was zero.

Refractive index (nd) and Abbe number (vd) of the glasses of the examples and comparative examples were measured with respect to glasses which were obtained by setting the rate of lowering of annealing temperature at 25° C./Hr.

In FIG. 1 plotting ISO/CCI (value G)-nd, coordinates of ISO/CCI (value G) and nd of Examples No. 1 to No. 48 are indicated by the mark ○, those of Comparative Examples A to F are indicated by the mark × and those of Comparative Examples G to I are indicated by the mark ■. Those of PBH6W and PBH53W (both are names of glass of Kabushiki Kaisha Ohara) are indicated by the mark ●.

Figure 2:
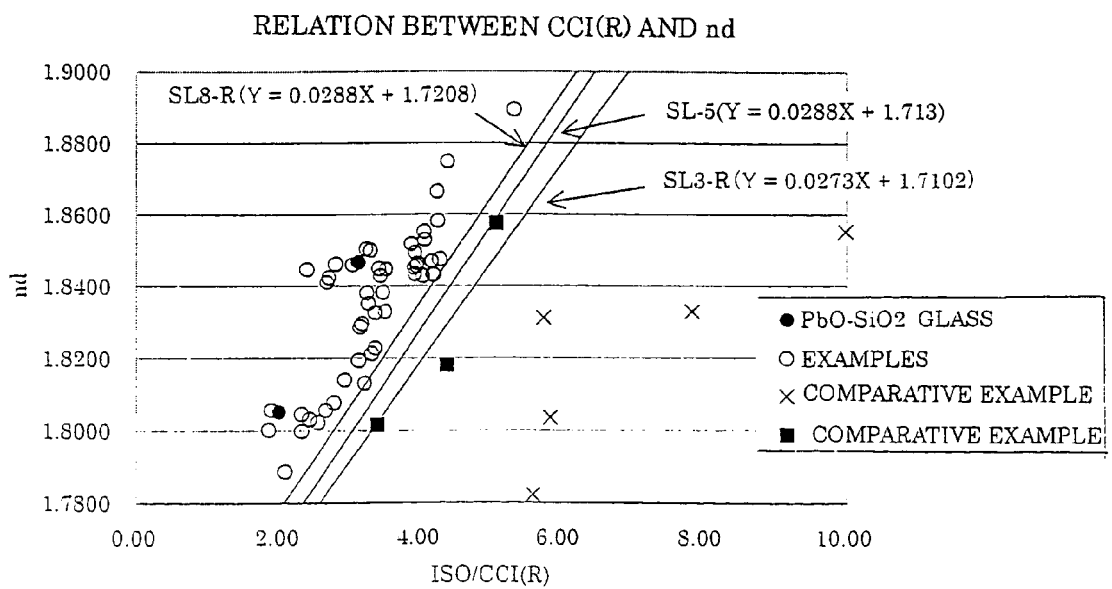
FIG. 2 is a graph showing X-Y coordinates with X-axis representing R value (calculated down to the second decimal place) of ISO Color Contribution Index (ISO/CCD specified in JIS7097 (expression of color contribution by ISO/CCI for taking a photograph) calculated on the basis of transmittance of a glass bulk within a range from 350 nm to 689 nm specified in JOGIS02$^{-1975}$ and Y-axis representing refractive index (nd).

In FIG. 2 plotting ISO/CCI (value R)-nd, coordinates of ISO/CCI (value R) and nd of Example No. 1 to No. 48 are indicated by the mark ○, those of Comparative Examples A to F are indicated by the mark × and those of Comparative Examples G to I are indicated by the mark ■. Those of PBH6W and PBH53W (both are names of glass of Kabushiki Kaisha Ohara) are indicated by the mark ●.

TABLE 1

| Examples | 1 | 2 | 3 | 4 | 5 |
|---|---|---|---|---|---|
| $SiO_2$ | 0.499 | 0.700 | 0.300 | 0.500 | 0.100 |
| $B_2O_3$ | 0.500 | 0.200 | 5.000 | 0.500 | 0.400 |
| $Al_2O_3$ | | | | | 0.500 |
| $P_2O_5$ | 25.000 | 29.000 | 18.000 | 25.000 | 25.000 |
| $Gd_2O_3$ | 2.000 | 1.360 | 1.000 | 2.130 | 3.500 |
| $ZrO_2$ | | | | | |
| $Nb_2O_5$ | 49.980 | 47.000 | 46.000 | 54.470 | 50.700 |
| $Ta_2O_5$ | | | | | |
| ZnO | | | | | |
| MgO | | | | | 0.730 |
| CaO | | | | | |
| SrO | | | 1.000 | | |
| BaO | 12.790 | 11.580 | 24.000 | 9.790 | 10.690 |
| $Li_2O$ | | | | | |
| $Na_2O$ | 7.630 | 8.000 | 4.690 | 7.610 | 7.810 |
| $K_2O$ | | | | | 0.560 |
| $Sb_2O_3$ | 0.001 | | 0.010 | | 0.010 |
| NaF | | | | | |
| $Bi_2O_3$ | 1.600 | 2.160 | | | |
| $WO_3$ | | | | | |
| $TiO_2$ | | | | | |
| $Lu_2O_3$ | | | | | |
| (F) | | | | | |
| Total | 100.000 | 100.000 | 100.000 | 100.000 | 100.000 |
| $(BaO + Nb_2O_5)/\{(TiO_2 + WO_3) \times 3 + Nb_2O_5 + Bi_2O_3\}$ | 1.22 | 1.19 | 1.52 | 1.18 | 1.21 |
| nd | 1.8447 | 1.8046 | 1.8529 | 1.8664 | 1.8448 |
| vd | 23.9 | 25.5 | 25.4 | 23.2 | 23.7 |
| Bubble (Class) | 1 | 1 | 1 | 1 | 1 |
| Inclusion (Class) | 1 | 1 | 1 | 1 | 2 |
| Striae (Class) | 1 | 1 | 1 | 1 | 1 |
| G | 2.07 | 2.00 | 3.59 | 3.72 | 2.98 |
| R | 2.37 | 2.30 | 4.05 | 4.23 | 3.39 |

TABLE 2

| Examples | 6 | 7 | 8 | 9 | 10 |
|---|---|---|---|---|---|
| $SiO_2$ | 0.200 | 0.500 | 0.500 | 0.500 | 0.500 |
| $B_2O_3$ | 0.800 | 0.500 | 0.500 | 0.500 | 0.500 |
| $Al_2O_3$ | | | | | |
| $P_2O_5$ | 25.000 | 25.000 | 25.000 | 27.800 | 25.000 |
| $Gd_2O_3$ | 2.000 | 1.000 | 1.500 | 0.280 | 2.130 |
| $ZrO_2$ | | | | 1.000 | |
| $Nb_2O_5$ | 50.110 | 46.800 | 44.500 | 44.600 | 50.780 |
| $Ta_2O_5$ | | | | | 0.800 |
| ZnO | | | | | |
| MgO | | | | | |
| CaO | | 0.800 | | 0.500 | |
| SrO | | | | | |
| BaO | 12.280 | 17.400 | 18.900 | 15.010 | 12.790 |
| $Li_2O$ | | | | | |
| $Na_2O$ | 7.610 | 8.000 | 8.000 | 8.000 | 7.500 |
| $K_2O$ | 2.000 | | | | |
| $Sb_2O_3$ | | | 0.001 | | |
| NaF | | | | | |
| $Bi_2O_3$ | | | | 1.099 | 1.810 |
| $WO_3$ | | | | | |
| $TiO_2$ | | | | | |
| $Lu_2O_3$ | | | | | |
| (F) | | | | | |
| Total | 100.000 | 100.000 | 100.000 | 100.000 | 100.000 |
| $(BaO + Nb_2O_5)/\{(TiO_2 +$ | 1.25 | 1.37 | 1.39 | 1.28 | 1.25 |

TABLE 2-continued

| Examples | 6 | 7 | 8 | 9 | 10 |
|---|---|---|---|---|---|
| $(BaO + Nb_2O_5)/\{(TiO_2 + WO_3) \times 3 + Nb_2O_5 + Bi_2O_3\}$ | | | | | |
| nd | 1.8287 | 1.8213 | 1.8140 | 1.8032 | 1.8434 |
| νd | 24.4 | 25.4 | 26.1 | 25.9 | 24.2 |
| Bubble (Class) | 1 | 1 | 1 | 1 | 1 |
| Inclusion (Class) | 1 | 1 | 1 | 3 | 1 |
| Striae (Class) | 1 | 1 | 1 | 1 | 1 |
| G | 2.72 | 2.86 | 2.53 | 2.10 | 3.40 |
| R | 3.13 | 3.29 | 2.91 | 2.42 | 3.91 |

TABLE 3

| Examples | 11 | 12 | 13 | 14 | 15 |
|---|---|---|---|---|---|
| $SiO_2$ | 0.500 | 0.500 | 0.200 | 0.500 | 0.500 |
| $B_2O_3$ | 0.500 | 0.500 | 0.500 | 0.500 | 3.500 |
| $Al_2O_3$ | | | | | |
| $P_2O_5$ | 25.000 | 25.000 | 23.000 | 29.000 | 25.000 |
| $Gd_2O_3$ | 2.130 | 2.000 | 2.130 | 1.400 | 2.130 |
| $ZrO_2$ | | | | | |
| $Nb_2O_5$ | 49.980 | 51.000 | 52.470 | 44.000 | 49.980 |
| $Ta_2O_5$ | | 1.500 | | | |
| ZnO | 2.800 | | | | |
| MgO | | | | | |
| CaO | 1.690 | | | | |
| SrO | | 0.350 | | | |
| BaO | 9.790 | 12.400 | 13.090 | 14.700 | 9.790 |
| $Li_2O$ | | | | | |
| $Na_2O$ | 7.610 | 8.000 | 7.110 | 8.000 | 7.610 |
| $K_2O$ | | | | | |
| $Sb_2O_3$ | | | | | |
| NaF | | 0.250 | | | |
| $Bi_2O_3$ | | | | 1.900 | 1.490 |
| $WO_3$ | | | | | |
| $TiO_2$ | | | | | |
| $Lu_2O_3$ | | | | | |
| (F) | | (0.113) | | | |
| Total | 100.000 | 100.000 | 100.000 | 100.000 | 100.000 |
| $(BaO + Nb_2O_5)/\{(TiO_2 + WO_3) \times 3 + Nb_2O_5 + Bi_2O_3\}$ | 1.20 | 1.24 | 1.25 | 1.28 | 1.16 |
| nd | 1.8456 | 1.8475 | 1.8748 | 1.7888 | 1.8352 |
| νd | 23.6 | 23.6 | 22.3 | 26.8 | 23.9 |
| Bubble (Class) | 2 | 1 | 1 | 1 | 1 |
| Inclusion (Class) | 2 | 2 | 2 | 1 | 1 |
| Striae (Class) | 1 | 3 | 1 | 1 | 1 |
| G | 3.42 | 3.70 | 3.80 | 1.80 | 2.76 |
| R | 3.93 | 4.26 | 4.37 | 2.07 | 3.24 |

TABLE 4

| Examples | 16 | 17 | 18 | 19 | 20 |
|---|---|---|---|---|---|
| $SiO_2$ | 0.550 | | | 0.508 | |
| $B_2O_3$ | 4.390 | 1.000 | | 0.508 | 0.500 |
| $Al_2O_3$ | | | | | 0.520 |
| $P_2O_5$ | 24.300 | 25.001 | 24.203 | 24.567 | 24.566 |
| $Gd_2O_3$ | 0.550 | 2.020 | 2.132 | 2.164 | 2.164 |
| $ZrO_2$ | | | | | |
| $Nb_2O_5$ | 46.450 | 49.975 | 49.975 | 50.733 | 50.727 |
| $Ta_2O_5$ | | | | | |
| ZnO | | | | | |
| MgO | | | | | |
| CaO | | 2.000 | | | |
| SrO | | | | | |
| BaO | 12.270 | 11.290 | 14.590 | 11.766 | 11.765 |
| $Li_2O$ | | | | | 2.030 |
| $Na_2O$ | 9.470 | 7.612 | 8.600 | 9.756 | 7.727 |
| $K_2O$ | | | 0.500 | | |
| $Sb_2O_3$ | 0.001 | 0.001 | | | |
| NaF | | | | | |
| $Bi_2O_3$ | 2.019 | 1.101 | | | |
| $WO_3$ | | | | | |
| $TiO_2$ | | | | | |
| $Lu_2O_3$ | | | | | |
| (F) | | | | | |
| Total | 100.000 | 100.000 | 100.000 | 100.000 | 100.000 |
| $(BaO + Nb_2O_5)/\{(TiO_2 + WO_3) \times 3 + Nb_2O_5 + Bi_2O_3\}$ | 1.21 | 1.20 | 1.29 | 1.23 | 1.23 |
| nd | 1.8057 | 1.8461 | 1.8462 | 1.8325 | 1.8381 |
| νd | 25.6 | 23.9 | 23.9 | 24.2 | 24.4 |
| Bubble (Class) | 1 | 1 | 1 | 1 | 1 |
| Inclusion (Class) | 1 | 1 | 1 | 1 | 1 |
| Striae (Class) | 1 | 1 | 1 | 1 | 1 |
| G | 1.65 | 2.63 | 2.56 | 2.90 | 2.80 |
| R | 1.88 | 3.02 | 2.78 | 3.34 | 3.22 |

TABLE 5

| Examples | 21 | 22 | 23 | 24 | 25 |
|---|---|---|---|---|---|
| $SiO_2$ | 0.508 | 0.508 | 0.508 | | |
| $B_2O_3$ | | | 0.508 | 0.700 | 0.500 |
| $Al_2O_3$ | | | | 1.507 | |
| $P_2O_5$ | 24.566 | 25.070 | 24.566 | 24.319 | 25.080 |
| $Gd_2O_3$ | 2.170 | 4.193 | 2.164 | 2.143 | 2.164 |
| $ZrO_2$ | | | | 1.005 | |
| $Nb_2O_5$ | 50.732 | 50.733 | 50.732 | 50.225 | 50.732 |
| $Ta_2O_5$ | | | | | |
| ZnO | 2.030 | | | | |
| MgO | | | | | |
| CaO | | | | | |
| SrO | | | | | |
| BaO | 11.765 | 11.766 | 12.781 | 12.150 | 11.765 |
| $Li_2O$ | | | | | |
| $Na_2O$ | 7.727 | 7.730 | 7.726 | 7.950 | 7.727 |
| $K_2O$ | 0.502 | | | | |
| $Sb_2O_3$ | | 0.001 | 0.001 | 0.001 | 0.001 |
| NaF | | | | | |
| $Bi_2O_3$ | | | | | |
| $WO_3$ | | | | | 2.030 |
| $TiO_2$ | | | 1.015 | | |
| $Lu_2O_3$ | | | | | |
| (F) | | | | | |
| Total | 100.000 | 100.000 | 100.000 | 100.000 | 100.000 |
| $(BaO + Nb_2O_5)/\{(TiO_2 + WO_3) \times 3 + Nb_2O_5 + Bi_2O_3\}$ | 1.23 | 1.23 | 1.18 | 1.24 | 1.10 |
| nd | 1.8500 | 1.8504 | 1.8552 | 1.8424 | 1.8518 |
| νd | 23.6 | 23.7 | 23.2 | 23.8 | 23.3 |
| Bubble (Class) | 1 | 1 | 1 | 1 | 1 |
| Inclusion | 1 | 1 | 1 | 1 | 1 |

TABLE 5-continued

| Examples | 21 | 22 | 23 | 24 | 25 |
|---|---|---|---|---|---|
| (Class) | | | | | |
| Striae (Class) | 1 | 1 | 1 | 1 | 1 |
| G | 2.92 | 2.79 | 3.60 | 2.33 | 3.35 |
| R | 3.27 | 3.21 | 4.04 | 2.68 | 3.85 |

TABLE 6

| Examples | 26 | 27 | 28 | 29 | 30 |
|---|---|---|---|---|---|
| $SiO_2$ | | 0.508 | 0.536 | | 0.508 |
| $B_2O_3$ | 0.499 | 1.523 | 0.538 | 1.614 | 1.614 |
| $Al_2O_3$ | 3.097 | | | | |
| $P_2O_5$ | 23.470 | 20.506 | 19.297 | 22.536 | 22.536 |
| $Gd_2O_3$ | 2.128 | 2.162 | 2.294 | 2.162 | 2.162 |
| $ZrO_2$ | | | | | |
| $Nb_2O_5$ | 49.925 | 50.736 | 53.700 | 50.736 | 50.736 |
| $Ta_2O_5$ | | | | | |
| ZnO | | | | | |
| MgO | | | | | |
| CaO | 1.998 | | 2.148 | | 4.061 |
| SrO | | | | | 0.000 |
| BaO | 11.278 | 13.796 | 12.134 | 11.765 | 9.735 |
| $Li_2O$ | | | | 2.030 | 0.000 |
| $Na_2O$ | 7.605 | 7.725 | 8.174 | 8.649 | 8.649 |
| $K_2O$ | | 3.045 | | 0.508 | |
| $Sb_2O_3$ | 0.001 | | | | |
| NaF | | | | | |
| $Bi_2O_3$ | | | 1.179 | | |
| $WO_3$ | | | | | |
| $TiO_2$ | | | | | |
| $Lu_2O_3$ | | | | | |
| (F) | | | | | |
| Total | 100.000 | 100.000 | 100.000 | 100.000 | 100.000 |
| $(BaO + Nb_2O_5)/\{(TiO_2 + WO_3) \times 3 + Nb_2O_5 + Bi_2O_3\}$ | 1.23 | 1.27 | 1.20 | 1.23 | 1.19 |
| nd | 1.8411 | 1.8452 | 1.8893 | 1.8383 | 1.8447 |
| νd | 24.3 | 24.1 | 22.1 | 24.6 | 24.3 |
| Bubble (Class) | 1 | 1 | 1 | 1 | 1 |
| Inclusion (Class) | 1 | 1 | 1 | 1 | 1 |
| Striae (Class) | 1 | 1 | 1 | 1 | 1 |
| G | 2.31 | 3.45 | 4.54 | 3.00 | 3.04 |
| R | 2.66 | 3.90 | 5.32 | 3.45 | 3.50 |

TABLE 7

| Examples | 31 | 32 | 33 | 34 | 35 |
|---|---|---|---|---|---|
| $SiO_2$ | | 0.140 | | | |
| $B_2O_3$ | 2.120 | 1.590 | 0.390 | 0.500 | |
| $Al_2O_3$ | | | | | |
| $P_2O_5$ | 20.506 | 21.200 | 25.500 | 25.000 | 25.000 |
| $Gd_2O_3$ | 2.162 | 2.130 | 2.130 | 1.000 | |
| $ZrO_2$ | | | | | |
| $Nb_2O_5$ | 50.736 | 50.980 | 49.980 | 51.000 | 49.980 |
| $Ta_2O_5$ | | | | | |
| ZnO | | | | | |
| MgO | | | | | |
| CaO | | 1.849 | | | |
| SrO | | | | | |
| BaO | 13.796 | 13.590 | 10.790 | 11.400 | 12.790 |
| $Li_2O$ | | | 4.000 | 3.000 | |
| $Na_2O$ | 10.680 | 8.520 | 5.610 | 6.000 | 8.610 |
| $K_2O$ | | | | | 0.500 |

TABLE 7-continued

| Examples | 31 | 32 | 33 | 34 | 35 |
|---|---|---|---|---|---|
| $Sb_2O_3$ | 0.001 | 0.001 | | | |
| NaF | | | | | |
| $Bi_2O_3$ | | | 1.600 | 1.600 | 1.600 |
| $WO_3$ | | | | | |
| $TiO_2$ | | | | | |
| $Lu_2O_3$ | | | | | 2.020 |
| (F) | | | | | |
| Total | 100.000 | 100.000 | 100.000 | 100.000 | 100.000 |
| $(BaO + Nb_2O_5)/\{(TiO_2 + WO_3) \times 3 + Nb_2O_5 + Bi_2O_3\}$ | 1.27 | 1.27 | 1.18 | 1.19 | 1.22 |
| nd | 1.8329 | 1.8582 | 1.8428 | 1.8493 | 1.8432 |
| νd | 24.3 | 23.6 | 24.6 | 24.1 | 23.9 |
| Bubble (Class) | 1 | 1 | 1 | 1 | 3 |
| Inclusion (Class) | 1 | 1 | 1 | 1 | 3 |
| Striae (Class) | 1 | 1 | 1 | 1 | 2 |
| G | 3.03 | 3.68 | 3.50 | 3.40 | 3.59 |
| R | 3.48 | 4.23 | 4.03 | 3.91 | 4.16 |

TABLE 8

| Examples | 36 | 37 | 38 | 39 | 40 |
|---|---|---|---|---|---|
| $SiO_2$ | 0.510 | | | | |
| $B_2O_3$ | 0.510 | 1.000 | 0.499 | 0.250 | |
| $Al_2O_3$ | | | 0.200 | 0.250 | |
| $P_2O_5$ | 25.515 | 24.286 | 25.000 | 25.000 | 27.800 |
| $Gd_2O_3$ | | | | 1.000 | 1.280 |
| $ZrO_2$ | | | | | |
| $Nb_2O_5$ | 51.640 | 51.550 | 51.000 | 45.750 | 45.600 |
| $Ta_2O_5$ | | | | | |
| ZnO | | | | | |
| MgO | | 1.000 | | | |
| CaO | | 2.137 | | | |
| SrO | 1.002 | | | | |
| BaO | 13.054 | 11.667 | 11.400 | 15.950 | 14.010 |
| $Li_2O$ | | | | | 1.000 |
| $Na_2O$ | 7.767 | 8.359 | 9.300 | 8.500 | 8.000 |
| $K_2O$ | | | | | |
| $Sb_2O_3$ | 0.001 | 0.001 | 0.001 | | |
| NaF | | | | | |
| $Bi_2O_3$ | | | | | |
| $WO_3$ | | | | 3.300 | 2.310 |
| $TiO_2$ | | | 2.600 | | |
| $Lu_2O_3$ | | | | | |
| (F) | | | | | |
| Total | 100.000 | 100.000 | 100.000 | 100.000 | 100.000 |
| $(BaO + Nb_2O_5)/\{(TiO_2 + WO_3) \times 3 + Nb_2O_5 + Bi_2O_3\}$ | 1.25 | 1.23 | 1.06 | 1.11 | 1.13 |
| nd | 1.8429 | 1.8470 | 1.8432 | 1.8228 | 1.8023 |
| νd | 23.7 | 23.8 | 23.6 | 25.2 | 26.0 |
| Bubble (Class) | 2 | 2 | 2 | 2 | 2 |
| Inclusion (Class) | 2 | 2 | 2 | 2 | 1 |
| Striae (Class) | 2 | 3 | 2 | 1 | 1 |
| G | 3.01 | 3.58 | 3.60 | 2.90 | 2.20 |
| R | 3.41 | 4.15 | 4.18 | 3.34 | 2.53 |

TABLE 9

| Examples | 41 | 42 | 43 | 44 | 45 |
|---|---|---|---|---|---|
| $SiO_2$ | | | 0.500 | 0.250 | |
| $B_2O_3$ | | 0.500 | 0.250 | | |
| $Al_2O_3$ | | 0.500 | 0.250 | 1.000 | 0.499 |
| $P_2O_5$ | 24.000 | 25.000 | 25.000 | 29.000 | 25.000 |
| $Gd_2O_3$ | 1.000 | 1.000 | 1.865 | 2.600 | 1.000 |
| $ZrO_2$ | | | | | |
| $Nb_2O_5$ | 48.000 | 52.000 | 48.230 | 47.000 | 51.000 |
| $Ta_2O_5$ | | | | | |
| ZnO | | 0.600 | | | |
| MgO | | | | | |
| CaO | | | | | |
| SrO | | | | | |
| BaO | 12.999 | 8.400 | 11.599 | 12.400 | 12.400 |
| $Li_2O$ | 1.000 | | 2.000 | | |
| $Na_2O$ | 13.000 | 12.000 | 7.805 | 8.000 | 10.100 |
| $K_2O$ | | | 3.000 | | |
| $Sb_2O_3$ | 0.001 | | 0.001 | | 0.001 |
| NaF | | | | | |
| $Bi_2O_3$ | | | | | |
| $WO_3$ | | | | | |
| $TiO_2$ | | | | | |
| $Lu_2O_3$ | | | | | |
| (F) | | | | | |
| Total | 100.000 | 100.000 | 100.000 | 100.000 | 100.000 |
| $(BaO + Nb_2O_5)/\{(TiO_2 + WO_3) \times 3 + Nb_2O_5 + Bi_2O_3\}$ | 1.27 | 1.16 | 1.24 | 1.26 | 1.24 |
| nd | 1.7999 | 1.8194 | 1.8078 | 1.8003 | 1.8296 |
| νd | 25.8 | 24.3 | 25.9 | 25.9 | 24.2 |
| Bubble (Class) | 1 | 1 | 1 | 1 | 1 |
| Inclusion (Class) | 1 | 1 | 1 | 1 | 1 |
| Striae (Class) | 1 | 1 | 1 | 1 | 1 |
| G | 2.00 | 2.70 | 2.40 | 1.60 | 2.80 |
| R | 2.30 | 3.11 | 2.76 | 1.84 | 3.15 |

TABLE 10

| Examples | 46 | 47 | 48 |
|---|---|---|---|
| $SiO_2$ | | 0.480 | 0.550 |
| $B_2O_3$ | | 0.500 | 4.390 |
| $Al_2O_3$ | | | |
| $P_2O_5$ | 25.000 | 24.970 | 24.300 |
| $Gd_2O_3$ | | 2.130 | 0.550 |
| $ZrO_2$ | | | |
| $Nb_2O_3$ | 44.500 | 49.920 | 46.450 |
| $Ta_2O_3$ | | | |
| ZnO | 1.000 | | |
| MgO | | | |
| CaO | | 2.000 | |
| SrO | | | |
| BaO | 18.900 | 11.280 | 12.260 |
| $Li_2O$ | | | |
| $Na_2O$ | 9.000 | 7.610 | 9.470 |
| $K_2O$ | | | |
| $Sb_2O_3$ | | 0.010 | 0.010 |
| NaF | | | |
| $Bi_2O_3$ | 1.600 | 1.100 | 2.020 |
| $WO_3$ | | | |
| $TiO_2$ | | | |
| $Lu_2O_3$ | | | |
| (F) | | | |
| Total | 100.000 | 100.000 | 100.000 |
| $(BaO + Nb_2O_3)/\{(TiO_2 + WO_3) \times 3 + Nb_2O_5 + Bi_2O_3\}$ | 1.38 | 1.20 | 1.21 |
| nd | 1.8131 | 1.8464 | 1.8057 |
| νd | 26.1 | 23.9 | 25.6 |
| Bubble (Class) | 2 | 1 | 1 |
| Inclusion (Class) | 2 | 1 | 1 |
| Striae (Class) | 1 | 1 | 1 |
| G | 2.68 | 3.43 | 2.30 |
| R | 3.19 | 3.94 | 2.65 |

TABLE 11

| Comparative Examples | A | B | C | D | E |
|---|---|---|---|---|---|
| $SiO_2$ | 2.90 | 2.50 | 1.00 | | |
| $B_2O_3$ | 5.00 | 5.00 | 8.00 | 4.50 | 7.40 |
| $Al_2O_3$ | | 0.50 | | | 0.84 |
| $Y_2O_3$ | | | | | |
| $La_2O_3$ | | | | | |
| $Gd_2O_3$ | | | | | |
| $TiO_2$ | 3.00 | | 2.00 | | |
| $ZrO_2$ | | | | | |
| $Nb_2O_5$ | 52.00 | 50.00 | 46.00 | 31.00 | 54.31 |
| $WO_3$ | | | | 7.00 | |
| $Ta_2O_5$ | 2.00 | | 2.30 | | |
| ZnO | | 5.00 | | | |
| MgO | | | | | |
| CaO | | | | | |
| SrO | | | | | |
| BaO | | | | 22.00 | |
| $Li_2O$ | | 1.90 | | 3.00 | |
| $Na_2O$ | 5.00 | 5.00 | 2.00 | 3.00 | |
| $K_2O$ | 10.00 | 5.00 | 10.00 | | 13.45 |
| $Sb_2O_3$ | 0.10 | 0.10 | 0.10 | | |
| PbO | | | | | |
| $Bi_2O_3$ | | | | 15.00 | |
| $P_2O_5$ | 20.00 | 25.00 | 26.50 | 14.50 | 24.00 |
| (F) | | | 2.10 | | (0.95) |
| $GeO_2$ | | | | | |
| $As_2O_3$ | | | | | |
| PbO | | | | | |
| Total | 100.00 | 100.00 | 100.00 | 100.00 | 100.00 |
| $(BaO + Nb_2O_5)/\{(TiO_2 + WO_3) \times 3 + Nb_2O_5 + Bi_2O_3\}$ | 0.85 | 1.00 | 0.88 | 0.79 | 1.00 |
| nd | 1.8328 | Does not glassify | 1.7821 | 1.8552 | 1.8035 |
| νd | 22.2 | Does not glassify | 23.9 | 23.0 | 23.1 |
| Bubble (Class) | 1 | — | 2 | 5 | 5 |
| Inclusion (Class) | 3 | — | 3 | 5 | 5 |
| G | 7.12 | — | 5.03 | 8.99 | 5.01 |
| R | 7.85 | — | 5.60 | 9.98 | 5.85 |

TABLE 12

| Comparative Example | F | G | H | I |
|---|---|---|---|---|
| $SiO_2$ | | | | |
| $B_2O_3$ | 2.05 | 3.77 | 2.30 | |
| $Al_2O_3$ | | | | |
| $Y_2O_3$ | | 3.06 | | |
| $La_2O_3$ | | | | |
| $Gd_2O_3$ | | | | |
| $TiO_2$ | 2.94 | | | |
| $ZrO_2$ | | | | |
| $Nb_2O_5$ | 44.94 | 35.97 | 40.45 | 62.00 |
| $WO_3$ | 6.82 | 7.84 | 9.20 | |

TABLE 12-continued

| Comparative Example | F | G | H | I |
|---|---|---|---|---|
| Ta$_2$O$_3$ | | | | |
| ZnO | 0.60 | | | |
| MgO | | | | |
| CaO | | | | |
| SrO | | | | |
| BaO | 5.64 | 20.75 | 16.23 | |
| Li$_2$O | 3.74 | 2.02 | 2.37 | |
| Na$_2$O | 6.84 | 4.19 | 4.10 | |
| K$_2$O | 1.39 | 3.19 | 1.87 | 14.00 |
| Sb$_2$O$_3$ | | | | |
| PbO | | | | |
| Bi$_2$O$_3$ | | | | |
| P$_2$O$_5$ | 25.04 | 19.21 | 23.48 | 24.00 |
| (F) | | | | |
| GeO$_2$ | | | | |
| As$_2$O$_3$ | | | | |
| PbO | | | | |
| Total | 100.00 | 100.00 | 100.00 | 100.00 |
| (BaO + Nb$_2$O$_3$)/{(TiO$_2$ + WO$_3$) × 3 + Nb$_2$O$_3$ + Bi$_2$O$_3$} | 0.68 | 0.95 | 0.83 | 1.00 |
| nd | 1.8311 | 1.8016 | 1.8181 | 1.8575 |
| vd | 23.7 | 28.2 | 25.9 | 21.3 |
| Bubble (Class) | 5 | 5 | 5 | 5 |
| Inclusion (Class) | 3 | 5 | 3 | 5 |
| G | 5.20 | 3.01 | 3.90 | 4.31 |
| R | 5.75 | 3.37 | 4.36 | 5.06 |

A high-refractive, high-dispersion glass contains a large quantity of ingredients which absorb light in the short-wavelength region of visible ray and, moreover, reflectance on the surface of the glass increases as the refractive index increases. As a result, deterioration in transmittance including reflection loss generally takes place in a high-refractive, high-dispersion optical glass. There is therefore general tendency to increasing in values of G and R of ISO Color Contribution Index with increase in the refractive index of the glass. PBH53W and PBH6W, glasses containing a large amount of PbO which have been manufactured and sold in the past, also exhibit increase in the values of ISO/CCI with increase in nd, as shown by the mark ● in FIGS. 1 and 2.

As shown in Tables 1 to 12 and FIGS. 1 and 2, the glasses of Examples No. 1 to No. 48 have smaller values of G and R and better transmittance, i.e., internal transmittance, in the short-wavelength region than the glasses of Comparative Examples A to F. Although the glasses of Comparative Examples G to I have low values of G and R of ISO/CCI, they have a large portion which is not homogeneous and therefore the internal quality of the glasses is poor and it is difficult to use them for a lens of an optical instrument.

The glasses of Examples No. 1 to No. 48 all exhibit excellent quality and, as compared to the glasses of Comparative Examples A to I, have better internal quality and lower values of ISO/CCI, i.e., superior transmittance in the short-wavelength region.

In sum, the optical glass of the present invention which is a P$_2$O$_5$—Nb$_2$O$_5$—BaO—Na$_2$O glass within a specific range of composition exhibits low values of ISO/CCI (G and R), i.e., excellent transmittance in the short-wavelength region and excellent internal quality within specific ranges of optical constants and, moreover, the optical glass of the present invention is free of PbO and As$_2$O$_3$ which require cost for protecting the environment.

Further, by adding Gd$_2$O$_3$ to the above composition, a high-refractive, high-dispersion optical glass which has improved resistance to devitrification and even more excellent internal quality can be provided.

Since it is possible to lower the glass transition point (Tg) to a desired point in the optical glass of the present invention, it is suitable for use as glass for a precision press, i.e., glass for mold pressing, which can be used as an optical element such as a lens directly after press forming without requiring grinding or polishing.

What is claimed is:

1. An optical glass comprising, in mass percent:

| | |
|---|---|
| P$_2$O$_5$ | 15–35% |
| Nb$_2$O$_5$ | 40–60% |
| Na$_2$O | 0.5% to less than 15% and |
| BaO | 3% to less than 25%; | having a ratio in mass % of (BaO+Nb$_2$O$_5$)/{(TiO$_2$+WO$_3$)×3+Bi$_2$O$_3$+Nb$_2$O$_5$}>1.0; being free of Pb and As; and having a refractive index (nd) within a range from 1.78 to 1.90 and an Abbe number (vd) within a range from 18 to 27.

2. An optical glass as defined in claim 1 further comprising, in mass %:

| | |
|---|---|
| Gd$_2$O$_3$ | 0–5% and/or |
| K$_2$O | 0–10% and/or |
| Li$_2$O | 0–10% and/or |
| Bi$_2$O$_3$ | 0–5% and/or |
| MgO | 0–10% and/or |
| CaO | 0–10% and/or |
| SrO | 0–10% and/or |
| ZnO | 0–3% and/or |
| SiO$_2$ | 0–5% and/or |
| B$_2$O$_3$ | 0–5% and/or |
| Al$_2$O$_3$ | 0–4% and/or |
| Ta$_2$O$_5$ | 0–5% and/or |
| ZrO$_2$ | 0–3% and/or |
| TiO$_2$ | 0–5% and/or |
| WO$_3$ | 0–8% and/or |
| Sb$_2$O$_3$ | 0–0.02%. |

3. An optical glass as defined in claim 1 which, in X-Y rectangular co-ordinates with X-axis representing ISO Color Contribution Index G calculated by using spectral transmittance of a glass material measured by the Japan Optical Glass Industry Standard JOGIS02$^{-1975}$ (Measuring Method for Degree of Coloring of Optical Glass) and Y-axis representing refractive index (nd), is within an area having a smaller value of ISO Color Contribution Index G and a higher refractive index (nd) than a straight line (SL$_3$-G): y=0.0277X+1.725 and which, in X-Y rectangular co-ordinates with X-axis representing ISO Color Contribution Index R calculated by using spectral transmittance of a glass bulk measured by the Japan Optical Glass Industry Standard JOGIS02$^{-1975}$ and Y-axis representing refractive index (nd), is within an area having a smaller value of ISO Color Contribution Index R and a higher refractive index (nd) than a straight line (SL3-R): Y=0.0273X+1.7102.

4. An optical glass as defined in claim 1 wherein the sum of sectional areas of bubbles contained in glass of 100 ml shown in Table 1 of the Japan Optical Glass Industry Standard JOGIS12$^{-1994}$ (Measuring Method for Bubble in Optical Glass) is Class 1–Class 4 and the sum of sectional areas of inclusion contained in glass of 100 ml shown in Table 1 of the Japan Optical Glass Industry Standard JOGIS13$^{-1994}$ (Measuring Method for Inclusion in Optical Glass) is Class 1–Class 4.

5. An optical glass as defined in claim 1 which, in X-Y rectangular co-ordinates with X-axis representing ISO Color Contribution Index G calculated by using spectral transmittance of a glass material measured by the Japan Optical Glass Industry Standard JOGIS02$^{-1975}$ (Measuring Method for Degree of Coloring of Optical Glass) and Y-axis representing refractive index (nd), is within an area having a smaller value of ISO Color Contribution Index G and a higher refractive index (nd) than a straight line (SL5-G): Y=0.0329X+1.7174 and which, in X-Y rectangular co-ordinates with X-axis representing ISO Color Contribution Index R calculated by using spectral transmittance of a glass bulk measured by the Japan Optical Glass Industry Standard JOGIS02$^{-1975}$ and Y-axis representing refractive index (nd), is within an area having a smaller value of ISO Color Contribution Index R and a higher refractive index (nd) than a straight line (SL5-R): Y=0.0288X+1.713.

6. An optical glass as defined in claim 1 comprising, in mass percent:

| | |
|---|---|
| $P_2O_5$ | 15–35% |
| $Nb_2O_5$ | 40–60% |
| $Na_2O$ | 0.5% to less than 15% and |
| BaO | 3% to less than 25%; | and further comprising, in mass %:

| | |
|---|---|
| $Gd_2O_3$ | 0–4% and/or |
| $K_2O$ | 0–6% and/or |
| $Li_2O$ | 0% to less than 6% and/or |
| $Bi_2O_3$ | 0% to less than 5% and/or |
| MgO | 0% to less than 10% and/or |
| CaO | 0% to less than 10% and/or |
| SrO | 0% to less than 10% and/or |
| ZnO | 0–3% and/or |
| $SiO_2$ | 0–5% and/or |
| $B_2O_3$ | 0–5% and/or |
| $Al_2O_3$ | 0–4% and/or |
| $Ta_2O_5$ | 0–5% and/or |
| $ZrO_2$ | 0–3% and/or |
| $Sb_2O_3$ | 0–0.02% and/or |
| $TiO_2$ | 0–5% and/or |
| $WO_3$ | 0–8% and/or |
| a fluoride or fluorides of a metal element or elements contained in the above metal oxides, a total amount of F contained in the fluoride or fluorides having a ratio in mass % of $(BaO + Nb_2O_5)/\{(TiO_2 + WO_3) \times 3 + Bi_2O_3 \; Nb_2O_5\} > 1.0$. | 0–5%; and |

7. An optical glass as defined in claim 1 comprising, in mass percent:

| | |
|---|---|
| $P_2O_5$ | 15–35% |
| $Nb_2O_5$ | 40–60% |
| $Na_2O$ | 0.5% to less than 15% and |
| BaO | 3% to less than 25%; | and further comprising, in mass %:

| | |
|---|---|
| $Gd_2O_3$ | 0.1–4% and/or |
| $K_2O$ | 0–6% and/or |
| $Li_2O$ | 0% to less than 6% and/or |
| $Bi_2O_3$ | 0% to less than 4.5% and/or |
| MgO | 0% to less than 10% and/or |
| CaO | 0% to less than 10% and/or |
| SrO | 0% to less than 10% and/or |
| ZnO | 0–3% and/or |
| $SiO_2$ | 0% to less than 5% and/or |
| $B_2O_3$ | 0% to less than 5% and/or |
| $Al_2O_3$ | 0–4% and/or |
| $Ta_2O_5$ | 0–5% and/or |
| $ZrO_2$ | 0–3% and/or |
| $Sb_2O_3$ | 0–0.01% and/or |
| $TiO_2$ | 0–5% and/or |
| $WO_3$ | 0–8% and/or |
| a fluoride or fluorides of a metal element or elements contained in the above metal oxides, a total amount of F contained in the fluoride or fluorides having a ratio in mass % of $(BaO + Nb_2O_5)/\{(TiO_2 + WO_3) \times 3 + Bi_2O_3 + Nb_2O_5\} > 1.0$. | 0–5%; and |

8. An optical glass as defined in claim 1 which, in X-Y rectangular co-ordinates with X-axis representing ISO Color Contribution Index G calculated by using spectral transmittance of a glass material measured by the Japan Optical Glass Industry Standard JOGIS02$^{-1975}$ (Measuring Method for Degree of Coloring of Optical Glass) and Y-axis representing refractive index (nd), is within an area having a smaller value of ISO Color Contribution Index G and a higher refractive index (nd) than a straight line (SL8-G): Y=0.0329X+1.7245 and which, in X-Y rectangular co-ordinates with X-axis representing ISO Color Contribution Index R calculated by using spectral transmittance of a glass bulk measured by the Japan Optical Glass Industry Standard JOGIS02$^{-1997}$ and Y-axis representing refractive index (nd), is within an area having a smaller value of ISO Color Contribution Index R and a higher refractive index (nd) than a straight line (SL8-R): Y=0.0288X+1.7208.

9. An optical glass as defined in claim 1 comprising, in mass percent:

| | |
|---|---|
| $P_2O_5$ | 15–30% |
| $Nb_2O_5$ | 42–60% |
| $Na_2O$ | 0.5% to less than 10% and |
| BaO | 5% to less than 25%; | and further comprising, in mass %:

| | |
|---|---|
| $Gd_2O_3$ | 0.1–4% and/or |
| $K_2O$ | 0–6% and/or |
| $Li_2O$ | 0–2% and/or |
| $Bi_2O_3$ | 0% to less than 4.5% and/or |
| MgO | 0% to less than 10% and/or |
| CaO | 0% to less than 10% and/or |
| SrO | 0% to less than 10% and/or |
| ZnO | 0–3% and/or |
| $SiO_2$ | 0.1% to less than 4% and/or |
| $B_2O_3$ | 0.2% to less than 5% and/or |
| $Al_2O_3$ | 0–4% and/or |
| $Ta_2O_5$ | 0–5% and/or |
| $ZrO_2$ | 0–3% and/or |
| $Sb_2O_3$ | 0–0.01% and/or |
| $TiO_2$ | 0–3% and/or |
| $WO_3$ | 0–5% and/or |
| a fluoride or fluorides of a metal element or elements contained in the above metal oxides, a total amount of F contained in the fluoride or fluorides having a ratio in mass % of $(BaO + Nb_2O_5)/\{(TiO_2 + WO_3) \times 3 + Bi_2O_3 + Nb_2O_5\} > 1.1$. | 0–5%; and |

10. An optical glass as defined in claim 1 wherein the sum of sectional areas of bubbles contained in glass of 100 ml shown in Table 1 of the Japan Optical Glass Industry Standard JOGIS12$^{-1994}$ (Measuring Method for Bubbles in Optical Glass) is Class 1–Class 3, the sum of sectional areas of inclusion contained in glass of 100 ml shown in Table 1 of Japan Optical Glass Industry Standard JOGIS13$^{-1994}$ (Measuring Method for Inclusion in Optical Glass) is Class 1–Class 3, and the degree of striae shown in Table 2 of the Japan Optical Glass Industry Standard JOGIS11$^{-1975}$ (Measuring Method for Striae in Optical Glass) is Class 1–Class 3.

11. An optical glass as defined in claim 1 wherein the degree of striae shown in Table 2 of the Japan Optical Glass Industry Standard JOGIS11$^{-1975}$ (Measuring Method for Striae in Optical Glass) is Class 1 or Class 2, the sum of sectional areas of bubbles contained in glass of 100 ml shown in Table 1 of the Japan Optical Glass Industry Standard JOGIS12$^{-1994}$ (Measuring Method for Bubble in Optical Glass) is Class 1 or Class 2, and the sum of sectional areas of inclusion contained in glass of 100 ml shown in Table 1 of Japan Optical Glass Industry Standard JOGIS13$^{-1994}$ (Measuring Method for Inclusion in Optical Glass) is Class 1 or Class 2.

12. An optical glass as defined in claim 1 having a refractive index (nd) within a range from 1.80 to 1.85 and an Abbe number (vd) within a range from 23.8 to 25.7.

13. An optical glass comprising, in mass percent:

| | |
|---|---|
| $P_2O_5$ | 15–35% |
| $Nb_2O_5$ | 40–60% |
| $Gd_2O_3$ | 0.1–4% |
| $Na_2O$ | 0.5% to less than 10% |
| $K_2O$ | 0–6% | where the total amount of $Na_2O$ and $K_2O$ is 0.5% to less than 10%

| | |
|---|---|
| $Bi_2O_3$ | 0% to less than 5% |
| MgO | 0% to less than 10% |
| CaO | 0% to less than 10% |
| SrO | 0 to less than 10% |
| BaO | 0.5% to less than 25% |
| ZnO | 0–3% |
| $SiO_2$ | 0% to less than 5% |
| $B_2O_3$ | 0.2% to less than 5% |
| $Al_2O_3$ | 0–3% |
| $Ta_2O_5$ | 0–5% |
| $ZrO_2$ | 0–3% |
| $Sb_2O_3$ | 0–0.03% |
| and a fluoride or fluorides of a metal element or elements contained in the above metal oxides, a total amount of F contained in the fluoride or fluorides | 0–5%; | being free of Pb, $WO_3$ and $TiO_2$ and having a refractive index (nd) within a range from 1.78 to 1.90 and an Abbe number (vd) within a range from 18 to 27.

14. An optical glass comprising, in mass percent:

| | |
|---|---|
| $P_2O_5$ | 15–30% |
| $Nb_2O_5$ | 42–60% |
| $Gd_2O_3$ | 0.1–4% |
| $Na_2O$ | 0.5–9.6% |
| $K_2O$ | 0–6% | where the total amount of $Na_2O$ and $K_2O$ is 0.5% to 9.6%

| | |
|---|---|
| $Bi_2O_3$ | 0–4.5% |
| MgO | 0% to less than 10% |
| CaO | 0% to less than 10% |
| SrO | 0% to less than 10% |
| BaO | 0.5% to less than 25% |
| ZnO | 0–3% |
| $SiO_2$ | 0.1% to less than 4% |
| $B_2O_3$ | 0.2% to less than 5% |
| $Al_2O_3$ | 0–3% |
| $Ta_2O_5$ | 0–5% |
| $ZrO_2$ | 0–3% |
| $Sb_2O_3$ | 0–0.03% |
| and a fluoride or fluorides of a metal element or elements contained in the above metal oxides, a total amount of F contained in the fluoride or fluorides | 0–5%; | being free of Pb, $WO_3$ and $TiO_2$ and having a refractive index (nd) within a range from 1.78 to 1.90 and an Abbe number (vd) within a range from 18 to 27.

* * * * *